June 28, 1932.  A. M. CURTIS  1,864,981
CIRCUIT BREAKER FOR MOTORS IN SIGNALING SYSTEMS
Filed April 20, 1929  2 Sheets-Sheet 1
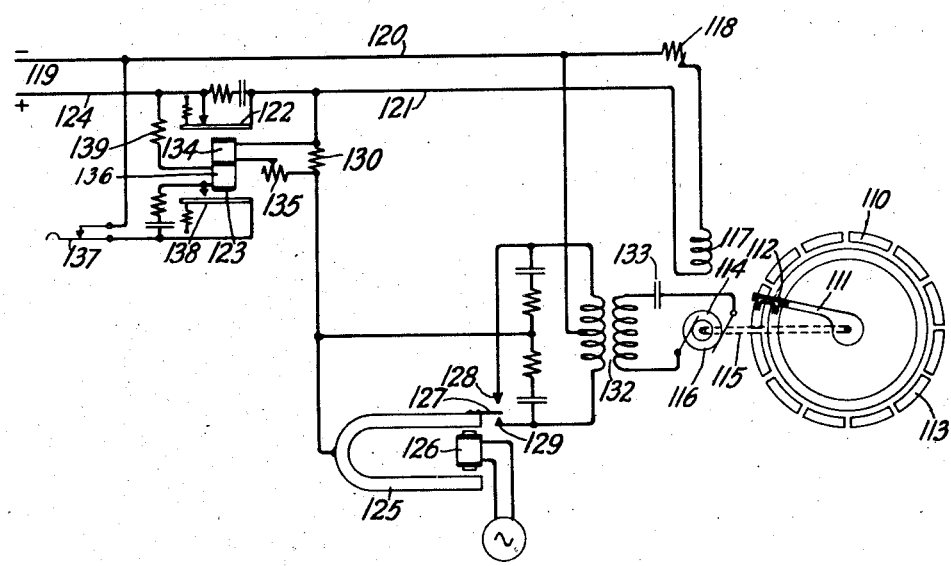
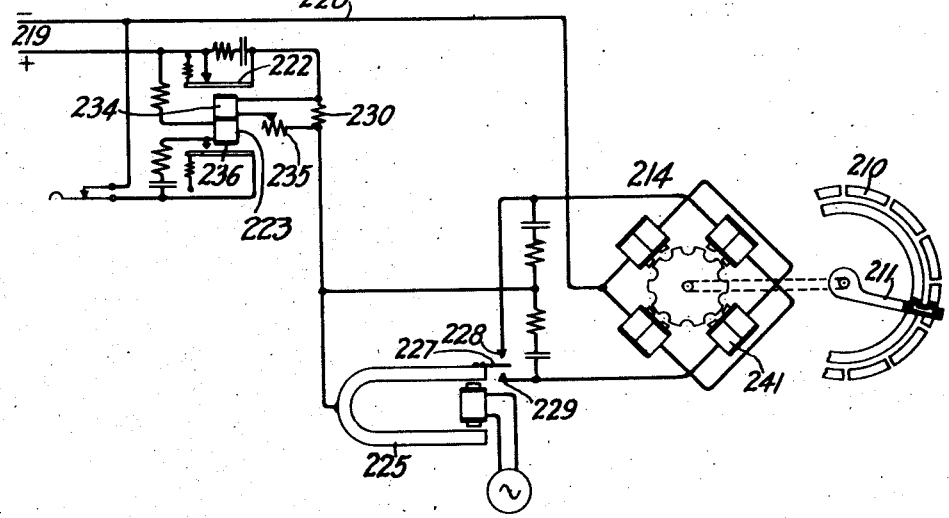
INVENTOR
A. M. CURTIS
BY
J. W. Schmied
ATTORNEY

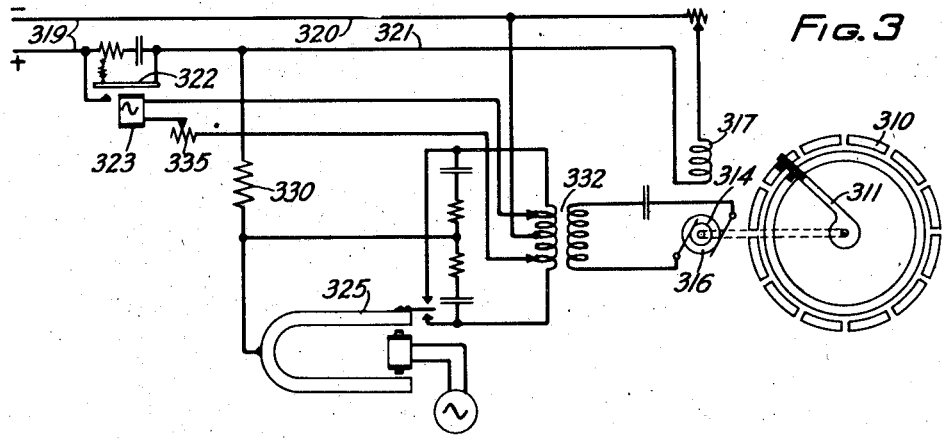
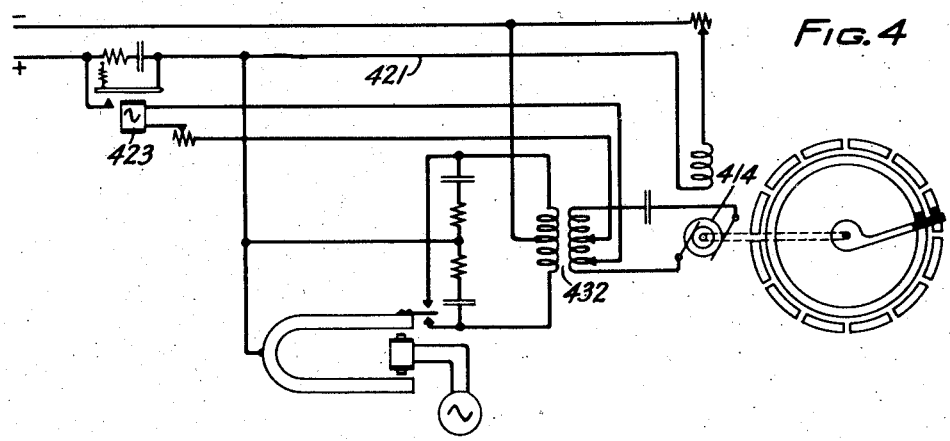
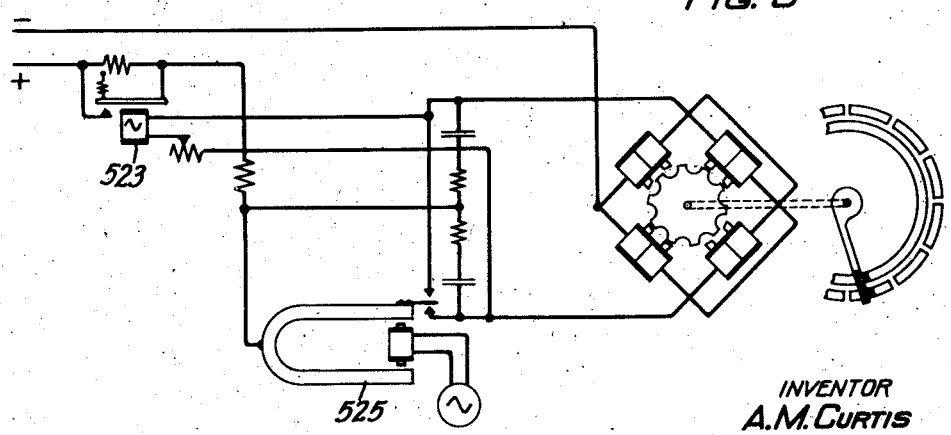

Patented June 28, 1932

1,864,981

UNITED STATES PATENT OFFICE

AUSTEN M. CURTIS, OF EAST ORANGE, NEW JERSEY, ASSIGNOR TO BELL TELEPHONE LABORATORIES, INCORPORATED, OF NEW YORK, N. Y., A CORPORATION OF NEW YORK

CIRCUIT BREAKER FOR MOTORS IN SIGNALING SYSTEMS

Application filed April 20, 1929. Serial No. 356,753.

This invention relates to synchronous motors and more particularly with reference to impulse motors commonly used to drive distributor brushes in multiplex telegraph systems.

An object of this invention is to prevent destruction of the distributor brushes caused by accidental stoppage and rebound of the impulse motor which drives the distributor brushes.

It is a common practice to drive the motor synchronously in such a system by impulses of direct current obtained from the contacts of the vibrating armature of a drive relay or an electrically driven tuning fork. It occasionally happens that the vibrating armature becomes welded to one of its contacts, in spite of the precautions taken to eliminate sparking. The result is that instead of supplying pulsating current in each of two branches of the circuit controlled thereby, the relay armature provides a single path for continuous current. If the impulse motor be of the type having a separately excited direct current field and an alternating current armature, the armature current is cut off, leaving the motor with a continuous field. A similar situation occurs when a motor of the La Cour type is employed, in which case the field changes from alternating to direct.

This condition brings the motor to an abrupt stop, and the rotor becomes aligned with the poles of the stator. Unfortunately, each tooth of the rotor, at the instant of stopping, overshoots a pole of the stator and is drawn back to it with considerable oscillation. If the distributor brushes be fastened on an arm rigid with the shaft of the motor, a momentary reversal of the motor results in the destruction of any brushes which may have just passed a gap between a pair of distributor segments, the free end of the brush being bent against the trailing edge of a segment.

The invention contemplates a method of preventing sudden stoppage of the impulse motor by providing means for automatically disconnecting the field current of the impulse motor from its source of electromotive force, whenever the drive relay fails to function properly. This result is accomplished by means of a circuit breaking device which operates when the current passing through the relay armature changes from pulsating to continuous. At such instant the current increases its value several times and becomes sufficiently great to operate the circuit breaker.

Another feature of the invention is a circuit breaker which automatically opens the field circuit of a motor whenever the voltage across the armature decreases below a predetermined value.

A feature of this inveniton is a circuit breaking arrangement comprising a resistance in series with the principal circuit, and a relay for automatically opening the circuit when the current and hence the potential drop across the resistance exceeds a predetermined value.

A further feature of this invention is a circuit breaker for two parallel circuits having a common source of electromotive force, which is so arranged that it will open both circuits when the current in one circuit becomes excessive.

Other objects and features of the invention will appear more clearly from the following description and claims taken in connection with the accompanying drawings.

Fig. 1 is a schematic diagram of the preferred embodiment of the invention, in which a motor having a separately excited field is employed.

Fig. 2 is a schematic diagram, showing the invention applied to a phonic wheel motor.

Figs. 3 and 4 are schematic diagrams of further modifications of the invention comprising a motor of the same type as shown in Fig. 1.

Fig. 5 is a schematic diagram of another modification of the invention comprising a phonic wheel motor.

Referring now to Fig. 1, a distributor 110, such as commonly employed in multiplex telegraph systems, is shown provided with a revolving arm 111. The arm carries one or more pairs of brushes 112 which pass over a plurality of rings including a segmented ring 113, in a manner well known in the art. Ring 113 comprises a plurality of metallic segments separated from each other by air gaps. The arm is driven by means of a synchronously rotating motor 114 having a shaft 115 rigidly connected to the arm.

The motor comprises an armature 116 and a field 117. The field is connected in series with a rheostat 118 to a source 119 of direct current electromotive force. This circuit is established by means of a conductor 120 connecting the rheostat with the source and another conductor 121 connecting the field with the armature 122 of a neutral relay 123. The relay armature has a "break" contact connected by means of conductor 124 to the positive side of the D. C. source.

The armature of the motor is supplied with alternating current derived from pulses of direct current controlled by a drive relay or vibrating tuning fork 125. The fork is kept in constant vibration by means of a magnet 126 energized by an alternating current of proper frequency. The fork has an armature 127 which alternately engages the contacts 128 and 129. The armature of relay 122 is connected through resistance 130 to conductor 121 in the field circuit. The contacts 128 and 129 are connected to the respective terminals of the primary windings of a transformer 132. The mid-point of this winding is connected to the other conductor 120 of the field circuit. The secondary coil of the transformer is connected in series with the motor armature 116 and a condenser 133.

The neutral relay 123 has a main winding shunted across the resistance 130 in series with a rheostat 135. The purpose of this winding is to attract the armature 122 when the voltage drop across resistance 130 exceeds a predetermined value. This operates to open the armature and field circuits respectively of the motor in a manner to be described subsequently. By means of the rheostat 135, the potential drop necessary to actuate relay 123 may be regulated. An auxiliary winding 136 is provided to maintain the relay in operative condition after it once becomes energized. The circuit for this winding is established by means of a release key 137 connected to one terminal of the D. C. source 119, relay armature 138, its "make" contact, winding 136, and a resistance 139 all in series, the latter being connected to the other terminal.

The relay armatures 122 and 138 and the tuning fork armature may be connected to each of their respective contacts by means of a resistance and condenser in series as shown, for the purpose of eliminating sparking between the armatures and contacts.

The operation of the circuit shown in Fig. 1 is as follows: During the normal operation of the drive relay or tuning fork, current from the positive terminal of source 119 passes through relay armature 122 and resistance 130 to the tuning fork armature 127. The latter impresses a positive potential alternately upon the contacts 128 and 129 which causes pulses of current to flow alternately from either terminal of the primary winding of transformer 132, through one-half of the winding and return from the mid point of the winding of the negative terminal of the source 119. The currents passing alternately in opposite directions through the primary winding induce an alternating current in the secondary winding, which passes through the motor armature. The alternating current in the armature cooperates with the steady field to drive the motor at a speed in synchronism with the vibrations of the tuning fork. It is to be understood that the latter may be replaced by any suitable type of relay, vibrated by any suitable source of alternating or pulsating current.

Should the armature 127 stick to one of its contacts, a continuous current will flow through one-half of the primary winding of transformer 132, thus cutting off the motor armature current, while a continuous field is left on the motor. In the absence of a circuit breaker, this condition would bring the motor to an abrupt stop and the rebound of the motor would cause the ends of the distributor brushes 112 to be bent against the trailing edges of the segments 113, as described in a preceding paragraph.

The impedance of the primary winding of the transformer 132 for a continuous current is very small, of course, compared to its value when the current is pulsating. Therefore, as a result of the reduced value of the impedance, the current in the tuning fork circuit comprising the resistance 130 and primary winding of the transformer, increases its value several times, upon faulty operation of the tuning fork. This condition creates a sufficiently great potential drop across the resistance 130 to actuate the relay 136 which operates to open the field circuit, as well as the tuning fork circuit. The contact of armature 138 is adjusted to close before that of armature 122 opens, and the operation of the relay, which is commenced by current in winding 134, is completed by current through winding 136.

When the relay is once energized, the auxiliary winding 136 holds it in this condition until the circuit for this winding is opened by manual pressure applied to the release key 137.

Referring now to Fig. 2, a phonic wheel motor 214 of the well known La Cour type is shown, which is adapted to drive the arm 211 of a distributor 210. A conductor 220 connects the negative terminal of a source 219 of D. C. electromotive force to an adjacent pair of magnets 241. The drive relay or vibrating tuning fork 225 has an armature 227 adapted to vibrate between contacts 228 and 229. The tuning fork armature 227 is alternately connected to the magnets 241 by means of a pair of conductors, each connecting one of the contacts in series with two oppositely located magnets and conductor 220. The armature 227 is connected to the positive terminal of source 219, through resistance 230 and armature 222 of a neutral relay 223. The neutral relay has a main winding 234 in series with rheostat 235. The winding and rheostat are shunted across resistance 230. An auxiliary winding 236 is connected to the source 219, in the same manner and for the same purpose as the winding 136 in the circuit of Fig. 1.

The operation of the circuit shown in Fig. 2 is similar in many respects to that of Fig. 1. As long as the tuning fork is vibrating, pulses of direct current are sent through alternate pairs of oppositely located magnets 241 of motor 214 to produce a variable magnetic field which drives the motor in synchronism with the vibration of tuning fork 225. The circuit is traced from the positive terminal of D. C. source 219, relay armature 222, potentiometer 230, tuning fork 225, either contact 228 or 229, a pair of magnets 241, and conductor 220 connected in series to the terminal of source 219. Should the armature 227 stick to one of its contacts, a steady current will pass through a pair of magnets, thereby producing a uniform magnetic field. The change from a pulsating current to a continuous current lowers the impedance of the magnets, causing an increased potential drop across resistance 230. The increase in current through the winding 234 energizes relay 223 sufficiently to cause the armature 222 to break from its contact, thus opening the motor circuit.

In the modification illustrated in Fig. 3, a distributor 310 is provided with a revolving arm 311 which is driven by a synchronous motor 314. The field 317 of this motor is connected by means of two conductors 320 and 321 to a source 319 of electromotive force. The latter conductor is connected to one terminal of source 319 through a circuit breaking arrangement, to be described subsequently. Connected also to conductor 321 through a resistance 330 is a synchronously vibrating tuning fork 325. The latter is adapted to drive the motor 314 with the aid of a transformer 382. The tuning fork 325, transformer 332 and motor armature 316 are connected together in the same manner as tuning fork 125, transformer 132 and motor armature 116 respectively of Fig. 1.

The connection between the conductor 321 and the corresponding terminal of the D. C. source is effected by means of the armature 322 of a relay 323 and its "make" contact. The relay winding in series with a rheostat 335 is shunted across the whole or a portion of the primary winding of transformer 332.

The normal operation of the circuit shown in Fig. 3 is similar to that of the circuit of Fig. 1. However, inasmuch as the conductor 321 is connected to source 319 through the "make" contact of relay armature 322, the transformer 332 will be supplied with current only so long as the winding of relay 323 remains energized. During the normal operation of the tuning fork 325, the tuning fork current at any instant takes two parallel paths; one through one-half of the primary winding of transformer 332; and the other through the winding of relay 323, resistance 335 and another portion of the said primary winding. Should the fork stick to one of its contacts, the current through the primary transformer winding changes from pulsating to continuous. The impedance of said winding decreases to a small fraction of its pulsating current value, and hence the potential drop across the same decreases. This reduces the current through the relay winding sufficiently to release the relay armature, thus opening the tuning fork and motor field circuits.

Fig. 4 shows an arrangement similar to that of Fig. 3. The former comprises a motor 414, relay 423 and transformer 432, corresponding in function to motor 314, relay 323 and transformer 332 respectively in Fig. 3. The relay winding in the arrangement of Fig. 4, however, is shunted across the secondary winding of transformer 432, or a portion thereof. The tuning fork may be connected directly to conductor 421 without the interposition of a resistance as in Fig. 3.

It is apparent, therefore, that the relay 423 will remain energized only as long as there is a current flowing through the secondary winding of transformer 432 and consequently the armature of motor 414. If, for any reason, the motor armature current be discontinued the relay 423 becomes completely deenergized and thus the circuit is opened.

Fig. 5 shows a circuit similar to that of Fig. 3, but differing therefrom in that a motor 514 of the La Cour type is connected in place of the primary winding of transformer 332 of Fig. 3. The arrangement of Fig. 5 comprises a relay 523 corresponding in position and function to relay 323 of Fig. 3. The winding of the former, in series with a rheostat, is shunted across the respective contacts of a tuning fork 525. The operation of the circuit shown in Fig. 5 is similar to that of Fig. 3 and will be understood without any further explanation.

The relays in the circuits of Figs. 3, 4 and 5 are each of the alternating current type. Each relay is adjusted so that its armature may be placed manually within the range of attraction of the magnet core. Whenever the armature is released by failure of the current, it becomes withdrawn immediately by the retractile spring beyond the influence of the core. It is necessary to reset the relay manually after each operation thereof.

What is claimed is:

1. A motor driving and controlling means comprising, in combination a synchronous motor having an armature supplied with an alternating current and a separately excited field, a drive relay having a vibrating armature connected in a circuit with a source of electromotive force to produce said alternating current, and automatic means for opening the field circuit when the relay armature ceases vibrating, to prevent the field from stopping the motor abruptly.

2. A driving and controlling means comprising in combination, a synchronous motor having an armature and a separately excited field, a distributor provided with a trailing brush connected to said motor to be driven thereby a drive relay having a vibrating armature in series with a resistance and a source of electromotive force, means for producing an alternating current in the motor armature synchronously with the vibration of the relay armature, and automatic means for opening the field circuit when the voltage drop across the resistance exceeds a predetermined value, said means being responsive to a continuous current through the relay armature.

3. A driving and controlling means for a synchronous motor having a separately excited field, comprising a drive relay operatively connected to a source of electromotive force to produce an alternating current in the motor armature, a distributor provided with a trailing brush connected to said motor to be driven thereby, and automatic means responsive to a failure of current in the motor armature for simultaneously disconnecting the relay from its source of electromotive force and opening the field circuit.

4. A driving and controlling arrangement for a synchronous motor having an armature and a separately excited field, comprising a drive relay having a vibrating armature connected in series with a resistance to a source of electromotive force, means for producing an alternating current through the motor armature synchronously with the vibration of the relay armature, a distributor provided with a trailing brush connected to said motor to be driven thereby and means responsive to an increase of current through the relay armature for opening the field circuit when the current through the relay armature circuit exceeds a predetermined value.

5. A driving and controlling arrangement for a synchronous motor adapted to be driven by pulses of direct current, comprising a drive relay having a vibrating armature connected in a circuit with a source of electromotive force to produce said pulses synchronously with the oscillations of the relay armature, a distributor provided with a trailing brush connected to said motor to be driven thereby, an automatic circuit breaking device for opening the relay armature circuit when the current therein exceeds a predetermined value, and means for predetermining the value of current in the drive relay armature circuit necessary to operate the circuit breaking device.

6. In a signaling system, a distributor having a revolving arm provided with a trailing brush, a motor for driving said arm, a drive relay having a vibrating armature operatively connected to a source of electromotive force to produce pulses of direct current for driving said motor, and automatic means for opening the relay armature circuit when the relay armature ceases vibrating.

7. In a signaling system, a distributor having a revolving arm provided with a trailing brush, a motor for driving said arm, said motor having an armature supplied with an alternating current and a separately excited direct current field, and automatic means for opening the field circuit upon decreases of the armature voltage.

8. A rotary distributor and safety device therefor comprising a phonic wheel motor, an arm adapted to be driven by the motor and provided with a trailing brush, a circuit for driving the motor, said circuit including the contacts of a vibrating relay, and means for breaking said circuit whenever the current therein becomes continuous, whereby to prevent sudden stoppage and rebound of the motor and consequent breaking of the brush.

In witness whereof, I hereunto subscribe my name this 18th day of April, 1929.

AUSTEN M. CURTIS.